US012459657B2

(12) United States Patent
Glemarec et al.

(10) Patent No.: US 12,459,657 B2
(45) Date of Patent: *Nov. 4, 2025

(54) STRUCTURE FOR LINKING AND SUPPORTING A TURBINE ENGINE ON AN AIRCRAFT PYLON

(71) Applicant: SAFRAN AIRCRAFT ENGINES, Paris (FR)

(72) Inventors: Guillaume Glemarec, Moissy-Cramayel (FR); Bruno Albert Beutin, Moissy-Cramayel (FR); Valerio Capasso, Moissy-Cramayel (FR); Jean-Baptiste Manuel Nicolas Vignes, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/562,235

(22) PCT Filed: May 17, 2022

(86) PCT No.: PCT/FR2022/050931
§ 371 (c)(1),
(2) Date: Nov. 17, 2023

(87) PCT Pub. No.: WO2022/248791
PCT Pub. Date: Dec. 1, 2022

(65) Prior Publication Data
US 2024/0239502 A1    Jul. 18, 2024

(30) Foreign Application Priority Data

May 27, 2021    (FR) ...................................... 2105534

(51) Int. Cl.
*B64D 27/40*    (2024.01)
*F01D 25/28*    (2006.01)

(52) U.S. Cl.
CPC .......... *B64D 27/40* (2024.01); *B64D 27/402* (2024.01); *B64D 27/404* (2024.01); *B64D 27/406* (2024.01); *F01D 25/28* (2013.01)

(58) Field of Classification Search
CPC ....... B64D 27/40; B64D 27/404; B64D 27/12
See application file for complete search history.

(56) References Cited

U.S. PATENT DOCUMENTS 3,079,128 A * 2/1963 Burge ................... F01D 17/162
                                                    415/174.4
5,452,575 A * 9/1995 Freid ..................... B64D 27/18
                                                    244/54

(Continued)

FOREIGN PATENT DOCUMENTS

EP    1493663 A1    1/2005
EP    3757012 A1    12/2020

(Continued)

OTHER PUBLICATIONS

International Search Report received for PCT Patent Application No. PCT/FR2022/050931, mailed on Sep. 9, 2022, 9 pages (4 pages of English Translation and 5 pages of Original Document).

(Continued)

*Primary Examiner* — Timothy D Collins
*Assistant Examiner* — Justin Michael Heston
(74) *Attorney, Agent, or Firm* — WOMBLE BOND DICKINSON (US) LLP

(57) ABSTRACT

A structure for linking and supporting a turbine engine on an aircraft pylon, the structure having a first longitudinal axis intended to extend parallel to a second longitudinal axis of the pylon, the structure including a first axial portion for fastening to the pylon, the first portion having an upper end that defines a substantially horizontal plane of interface with the pylon, and a lower end bearing suspension rods for suspending the turbine engine, which extend in a rear (Continued)

vertical plane; and a second axial portion that is intended to extend forward of the pylon and includes at least one suspension member of the turbine engine in a front vertical plane.

13 Claims, 7 Drawing Sheets

(56) References Cited

U.S. PATENT DOCUMENTS

| | | | |
|---|---|---|---|
| 6,474,597 B1 * | 11/2002 | Cazenave | B64D 27/18 244/54 |
| 7,232,091 B2 * | 6/2007 | Marche | B64D 27/404 244/54 |
| 7,322,790 B2 | 1/2008 | Bouru | |
| 9,394,057 B2 * | 7/2016 | Guillou | B64D 27/40 |
| 10,385,872 B2 * | 8/2019 | Hugon | F01D 11/001 |
| 2005/0067528 A1 | 3/2005 | Loewenstein et al. | |
| 2008/0156930 A1 * | 7/2008 | Audart-Noel | B64D 27/40 60/797 |
| 2009/0134271 A1 | 5/2009 | Baillard et al. | |
| 2009/0218441 A1 | 9/2009 | Marche | |
| 2015/0047370 A1 | 2/2015 | Beaujard et al. | |
| 2021/0380265 A1 * | 12/2021 | Garnaud | B64D 27/40 |
| 2024/0270396 A1 * | 8/2024 | Beutin | F01D 25/28 |

FOREIGN PATENT DOCUMENTS

| | | |
|---|---|---|
| FR | 2892706 A1 | 5/2007 |
| FR | 2969700 A1 | 6/2012 |
| FR | 2987347 A1 | 8/2013 |
| FR | 2987401 A1 | 8/2013 |
| FR | 3015434 A1 | 6/2015 |
| FR | 3058127 A1 | 5/2018 |
| WO | 2012/085388 A1 | 6/2012 |
| WO | 2020/074811 A1 | 4/2020 |

OTHER PUBLICATIONS

Kim et al., "Variable Guide Vane Scheduling Method Based on the Kinematic Model and Dual Schedule Curves", Applied Sciences, vol. 10, No. 19, Sep. 23, 2020, pp. 1-17.

* cited by examiner

[Fig.1]
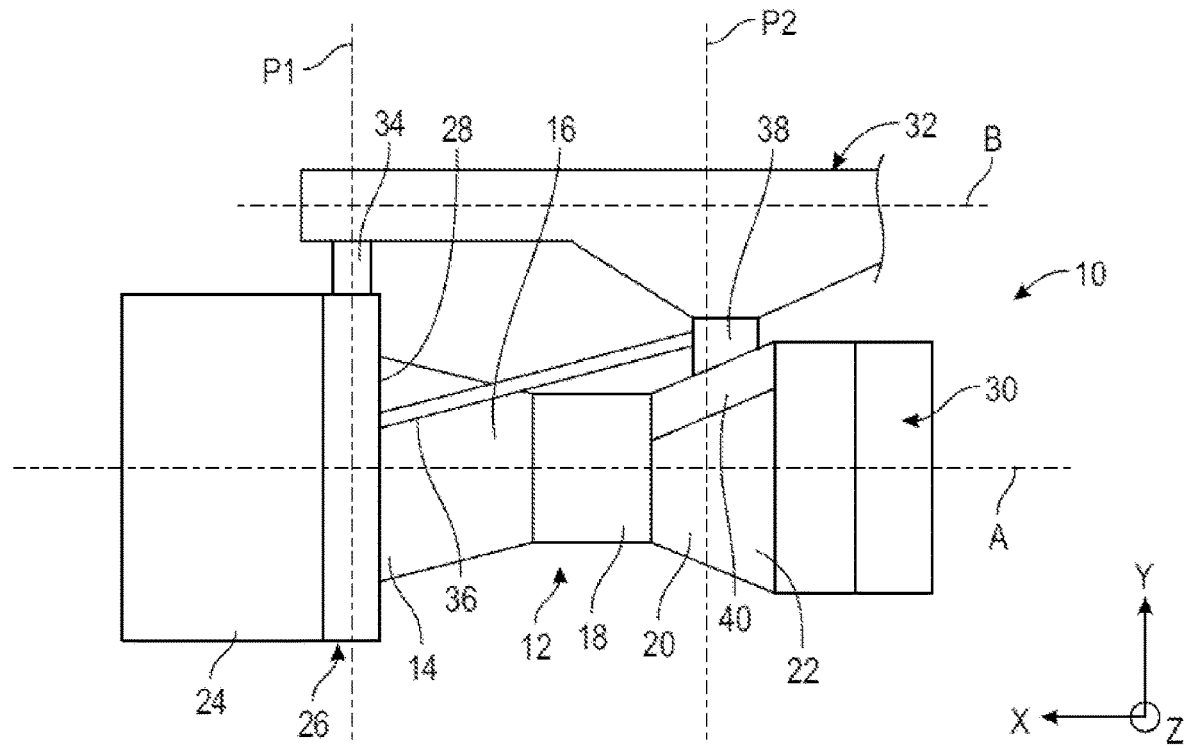
[Fig.2]
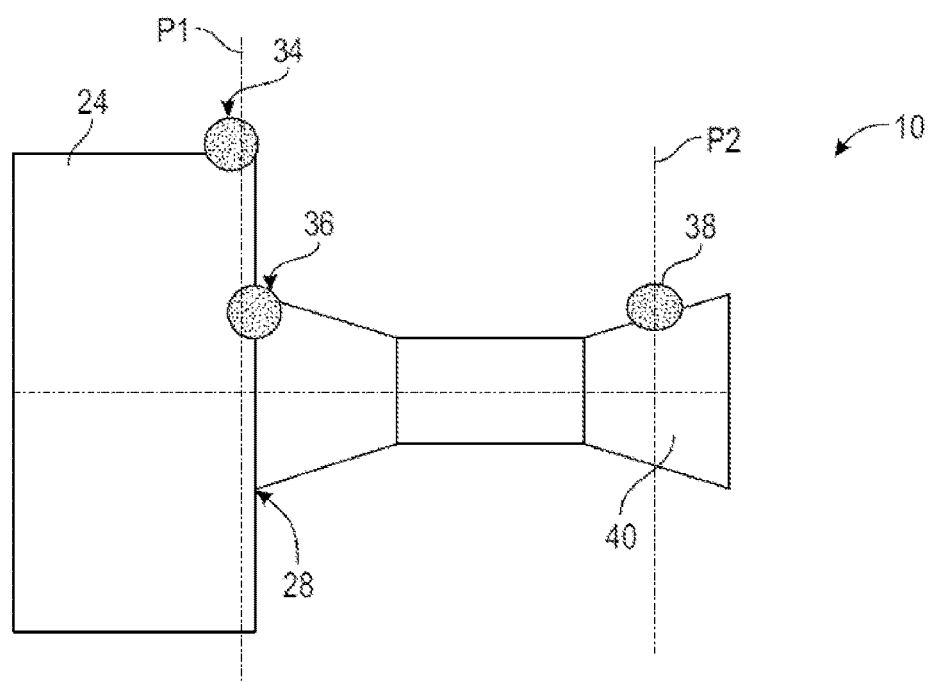

[Fig.3]
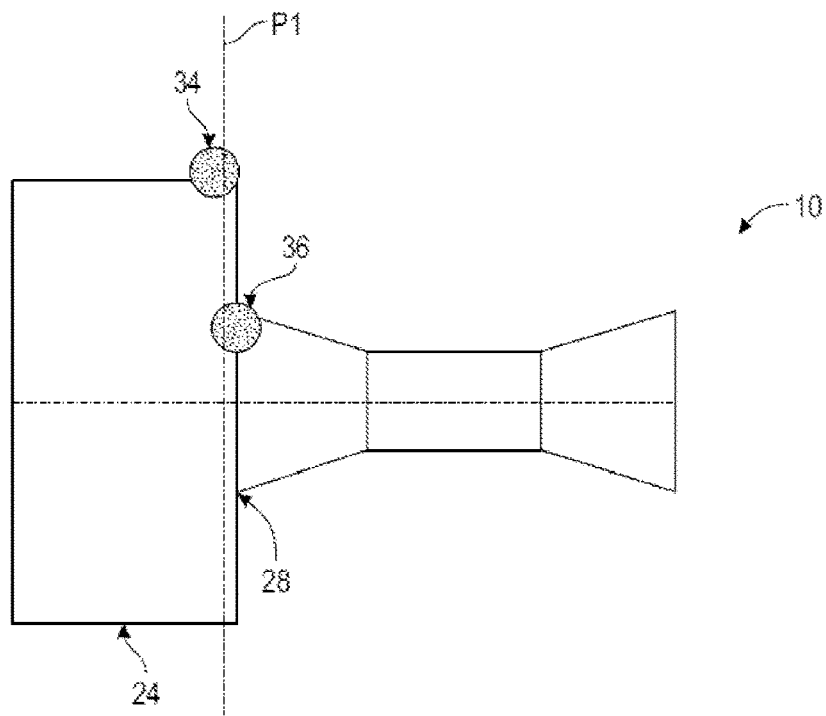
[Fig.4]
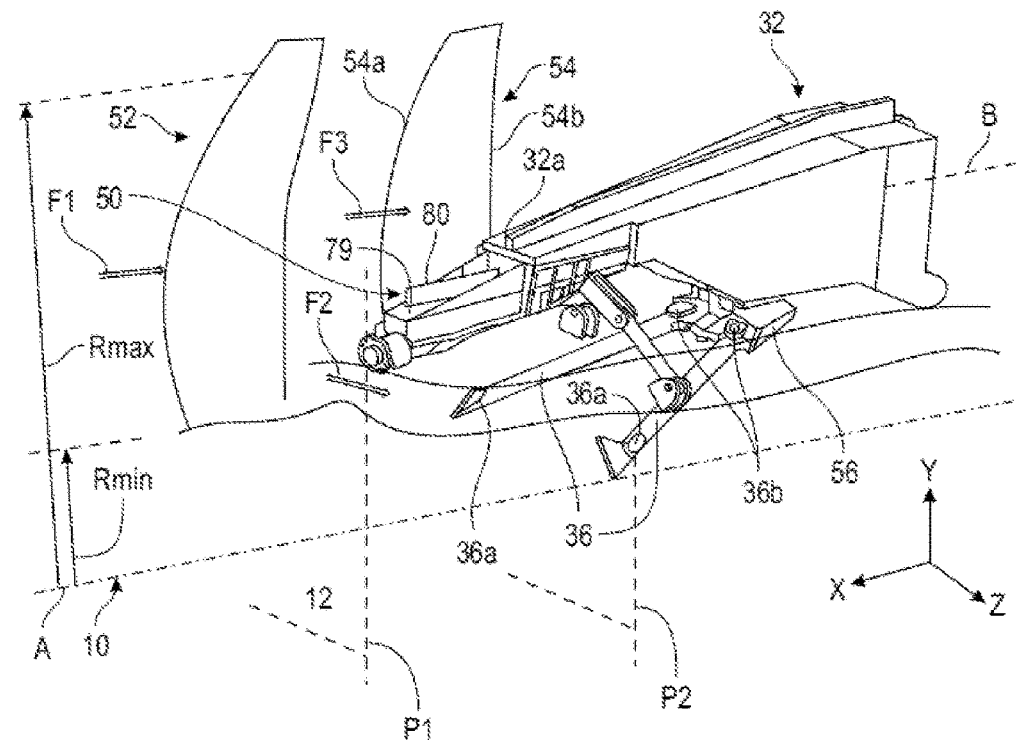

[Fig.5]
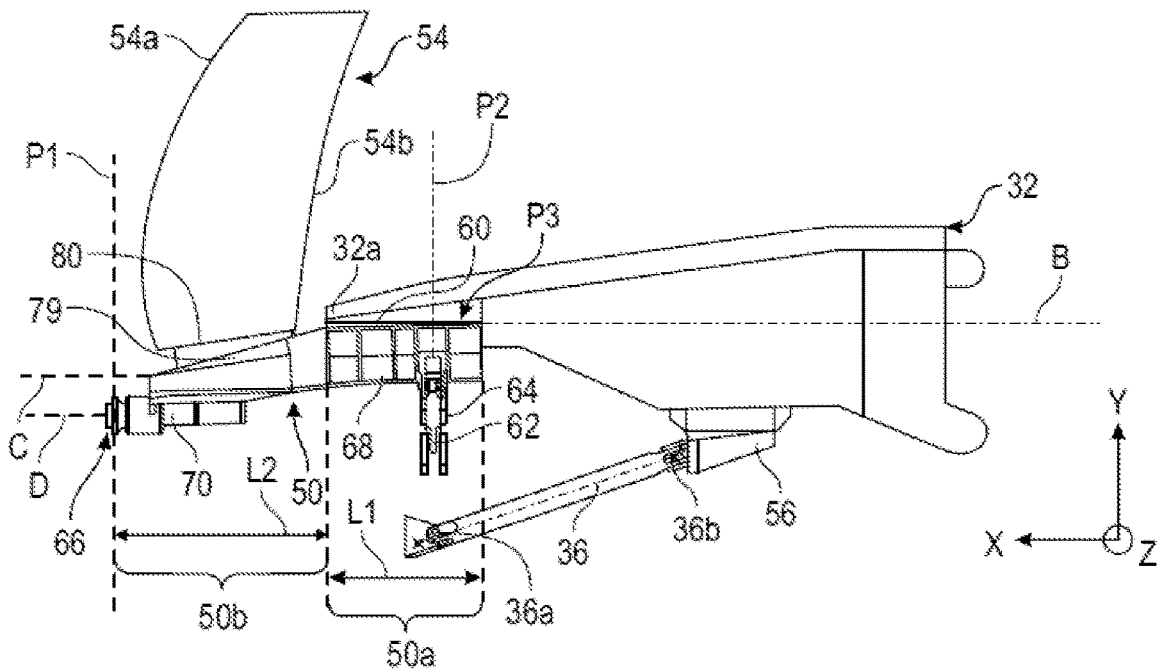
[Fig.6]
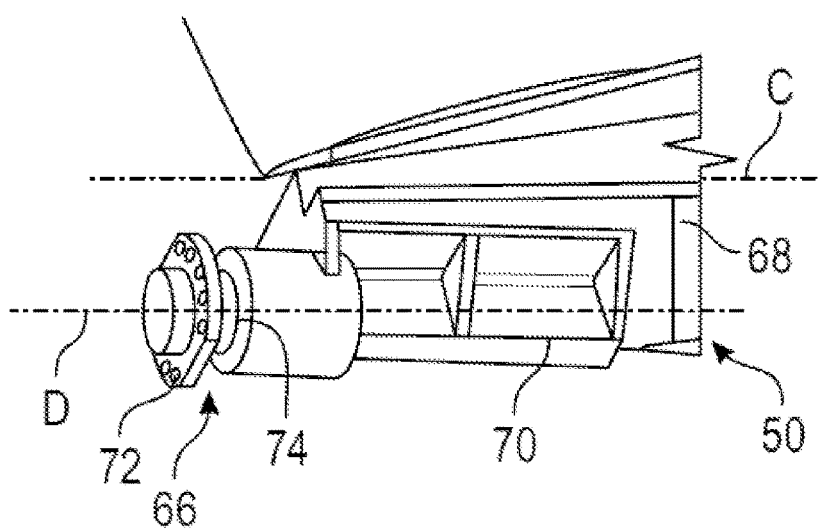

[Fig.7]
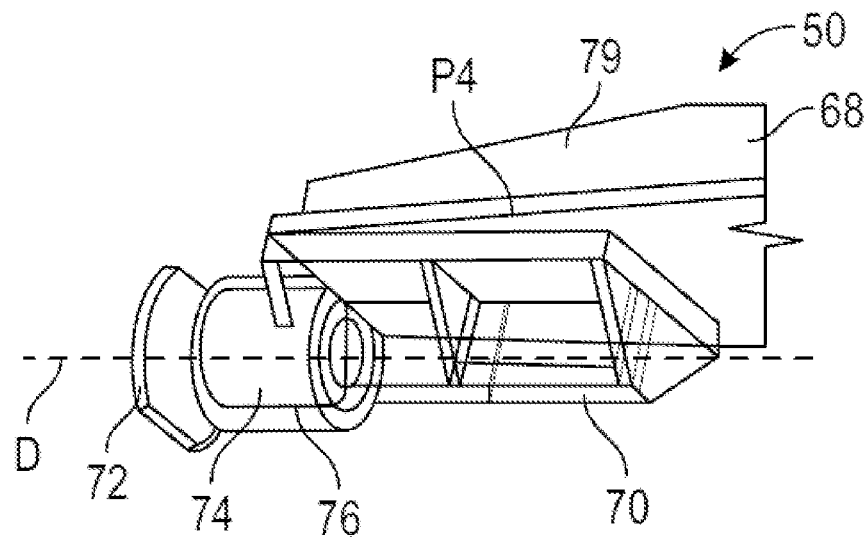
[Fig.8]
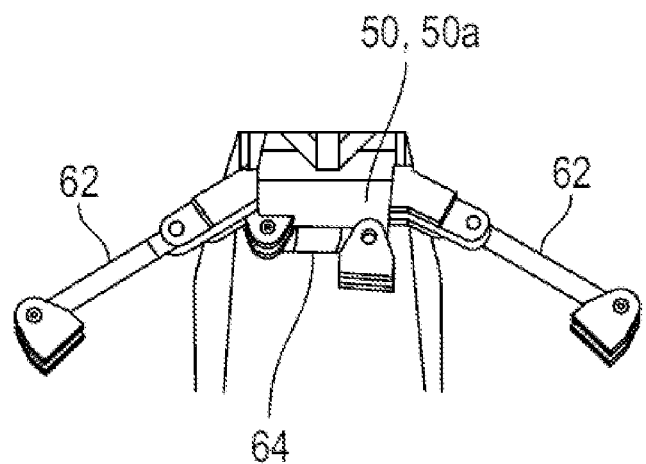

[Fig.9]
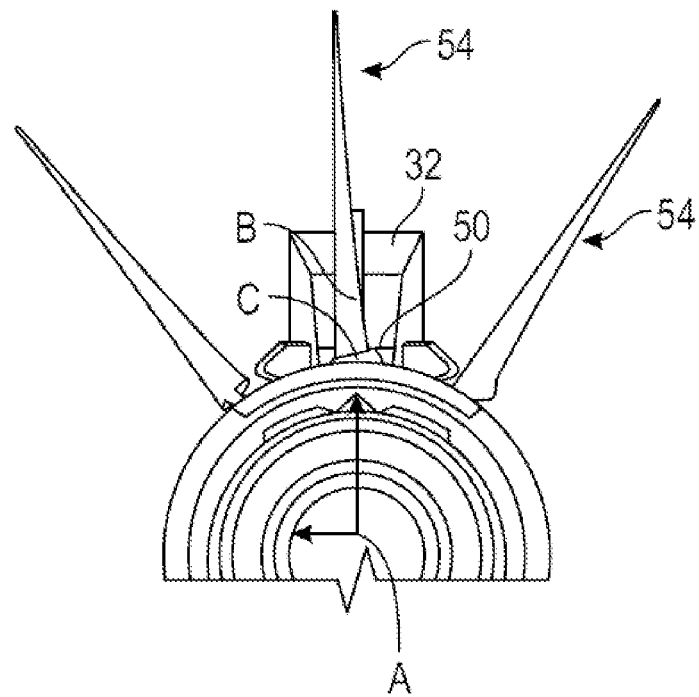
[Fig.10]
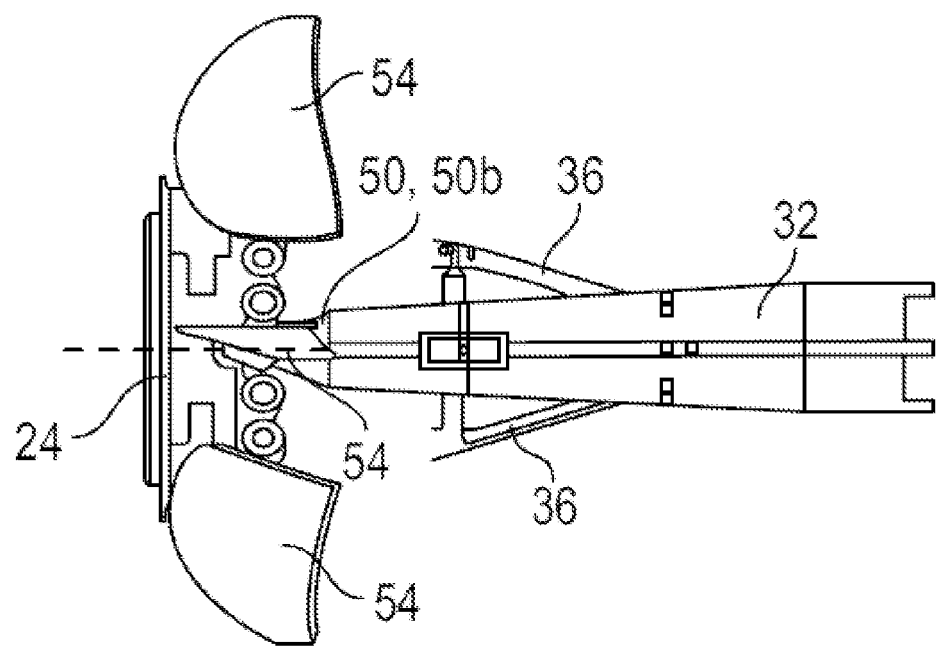

[Fig.11]
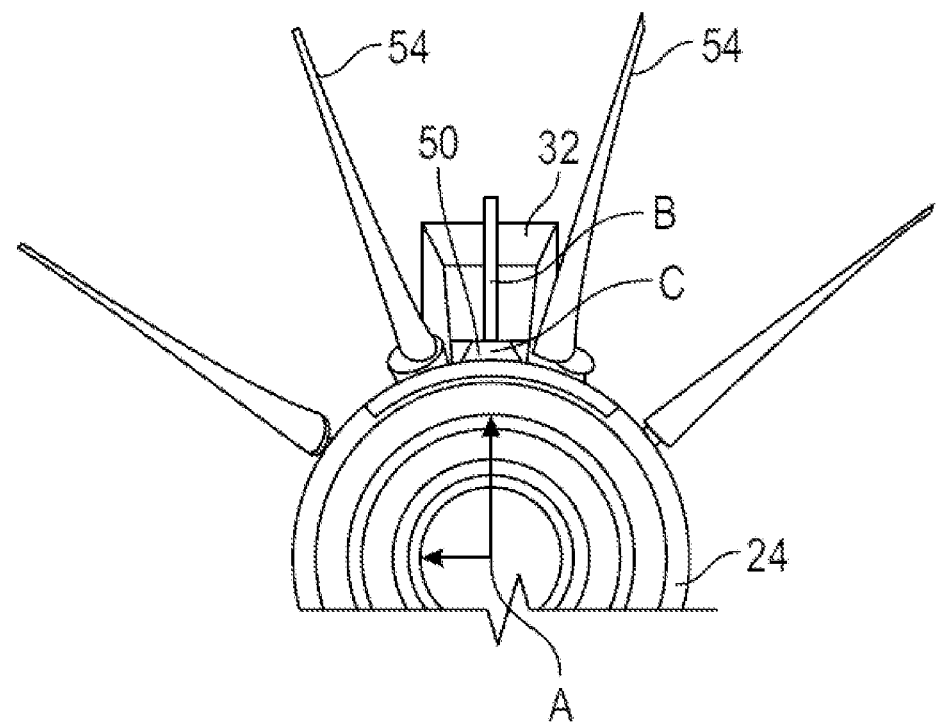
[Fig.12]
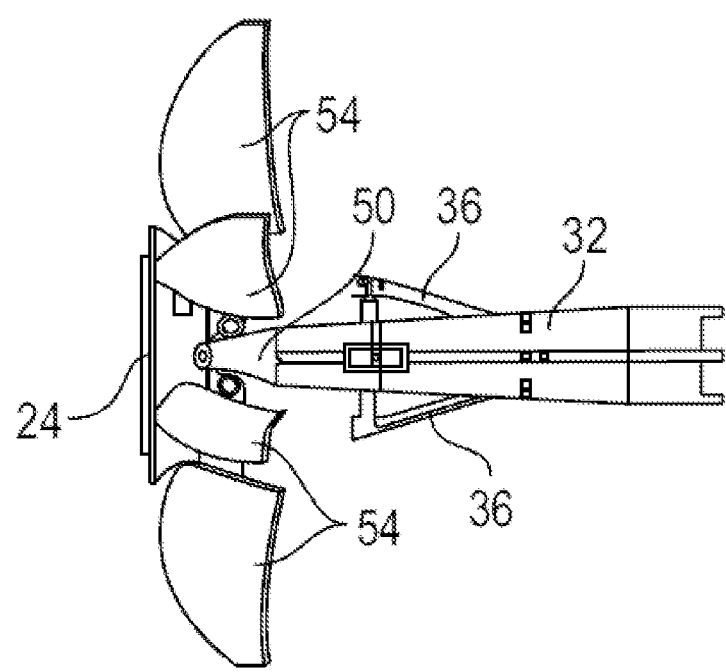

[Fig.13]
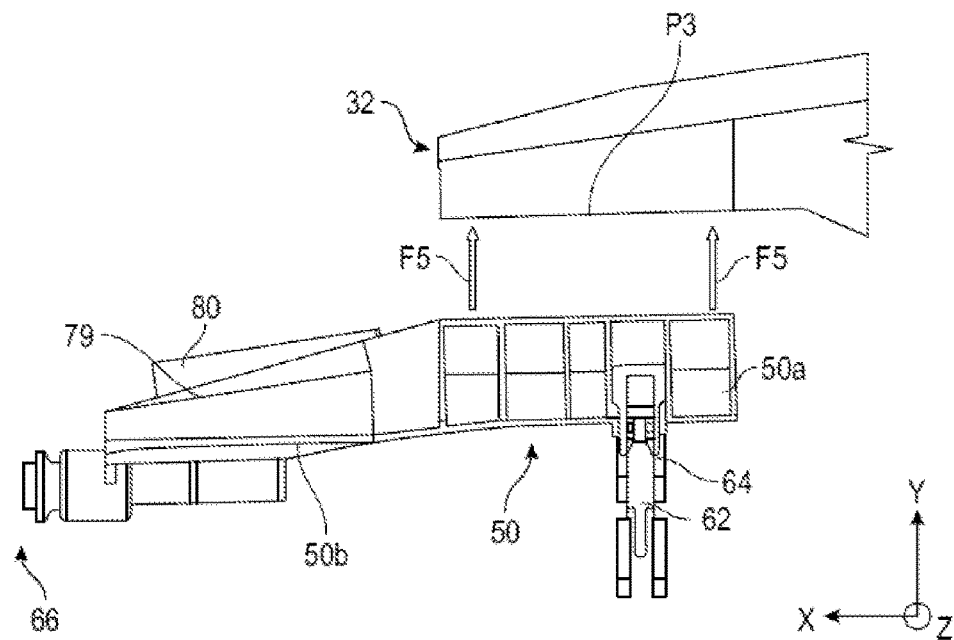
[Fig.14]
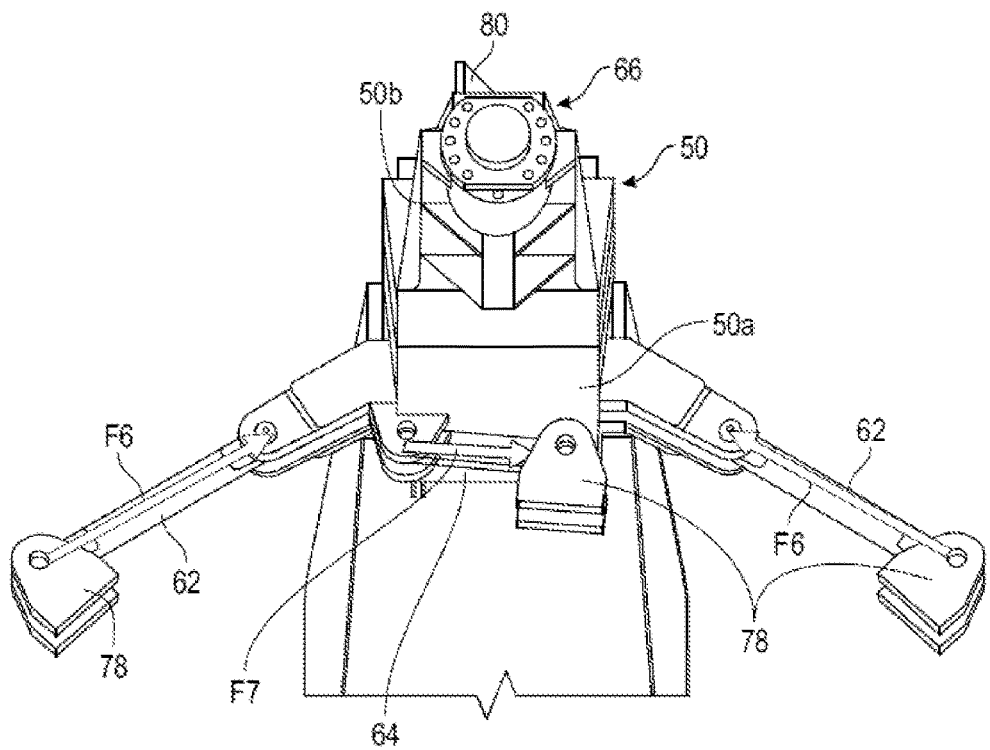

STRUCTURE FOR LINKING AND SUPPORTING A TURBINE ENGINE ON AN AIRCRAFT PYLON

TECHNICAL FIELD OF THE INVENTION

This invention relates to a structure for linking and supporting a turbine engine to an aircraft pylon.

TECHNICAL BACKGROUND

The prior art includes in particular, the documents, FR-A1-2,892,706, FR-A1-2,969,700, FR-A1-2,987,347, FR-A1-2,987,401, FR-A1-3,015,434, FR-A1-3,058,127, U.S. Pat. Nos. 6,474,597 B1, 7,232,091 B2, 5,452,575 and US-A1-2008/156930.

An aircraft turbine engine comprises a gas generator which typically comprises, from upstream to downstream, with reference to the flowing of the gases in the turbine engine, at least one compressor, an annular combustion chamber and at least one turbine. In the case of a low-pressure and high-pressure turbofan engine with double body, the gas generator comprises a low-pressure compressor, a high-pressure compressor, the combustion chamber, the high-pressure turbine and the low-pressure turbine. The gas generator defines an annular duct for the flow of a gas flow, referred to as the primary flow, which passes through the compressors, the combustion chamber and the turbines.

The rotor of the high-pressure compressor is connected to the rotor of the high-pressure turbine by a high-pressure shaft. The rotor of the low-pressure compressor is connected to the rotor of the low-pressure turbine by a low-pressure shaft which passes through the high-pressure shaft and which drives in rotation a propulsion propeller located generally upstream of the gas generator.

When this propeller is ducted and therefore surrounded by an annular casing, this propeller is called a fan and generates an air flow which flows around the gas generator and is referred to as a secondary flow. When the propeller is not ducted, it also generates an air flow that flows around the gas generator.

The turbine engine is fastened to an element of the aircraft, such as a wing or the fuselage, by means of a hooking pylon also referred to as mast. This pylon is generally elongated in shape and comprises a beam extending parallel to the longitudinal axis of the turbine engine. If the turbine engine is fastened under a wing of the aircraft, the pylon is located at 12 o'clock (12 hours) by analogy with the face of a clock.

In the current technique, the pylon comprises upstream members for fastening and suspending the turbine engine that are dedicated to one type of turbine engine and cannot be used for another type of turbine engine. These fasteners are intended, for example, to be fixed to a fan casing of a turbine engine, which surrounds the fan propeller, and therefore cannot be used for a turbine engine with an unducted propeller because this turbine engine does not comprise a fan casing.

In addition, the fastening pylon can comprise downstream members for fastening and suspending the downstream end of a turbine engine. However, this configuration causes its disadvantages. Indeed, during operation, the gas generator ensures a transmission of the stresses between the upstream and downstream fastening points on the pylon, resulting in deformation of the generator and the gas and in changes to the clearances between the rotors and the stators of the gas generator. The gas generator is therefore subject to a moment generated by the axial stresses (off-axis thrust and thrust-reacting). The turbine engine is also subject to a moment generated by the asymmetry of axial stresses on the vanes of the fan propeller, and to stresses resulting from the capture of air (sleeve stresses) by the turbine engine. It is therefore understandable that the performance and the operability of the turbine engine may be affected by these stresses.

One solution to this problem would be to fasten in a cantilevered manner the turbine engine to the pylon. This would mean suspending a front or upstream portion of the turbine engine from the pylon and leaving the rear or downstream portion of the turbine engine, such as its turbine casing, free.

Another problem relates to the hoisting of the turbine engine from a storage station on the ground to the pylon to which the turbine engine is intended to be fastened. The hoisting of a turbine engine may require movements in several directions until the turbine engine comes alongside the pylon and can be fastened to the pylon.

The present invention proposes an improvement on current technologies, which allows to solve at least one portion of the problems and disadvantages mentioned above.

SUMMARY OF THE INVENTION

The invention relates to a structure for linking and supporting a turbine engine to an aircraft pylon, the structure being of generally elongate form and having a first axis of elongation intended to extend parallel to a second axis of elongation of the pylon, the structure comprising:
  a first axial segment for fastening to the pylon, this first segment comprising an upper end which defines a substantially horizontal plane of interface with the pylon, and a lower end carrying suspension connecting rods which are intended to be connected to the turbine engine and which extend in a first substantially vertical plane, referred to as the rear plane, and
  a second axial segment which is intended to extend in front of the pylon and comprising at least one suspension member which is intended to be connected to the turbine engine and which extends in a second substantially vertical plane, referred to as the front plane, this front plane being at an axial distance from the rear plane.

The linking structure according to the invention has a double advantage. The first advantage is that it allows the turbine engine to be suspended in two planes, respectively front and rear. In other words, the front and rear suspensions of the turbine engine are brought together and integrated within the structure, resulting in a single suspension structure of the turbine engine. The structure is preferably connected to an upstream portion of the turbine engine, such as an intermediate casing. The turbine engine is then intended to be mounted in a cantilevered manner onto the pylon since it does not comprise a downstream portion, such as a turbine casing, intended to be connected to the pylon.

A second advantage of the invention relates to the hoisting of the turbine engine, which is made easier by the linking structure. This linking structure comprises a horizontal plane of interface which defines a docking area of the pylon. When the turbine engine is hoisted, it can simply be moved in a single vertical direction from bottom to the top, until the structure rests on the pylon in this plane. The structure is then fastened to the pylon. In addition, the second segment is advantageously connected directly to the root of the vane to facilitate the integration of the linking structure into the turbine engine.

The structure according to the invention may comprise one or more of the following characteristics, taken in isolation from each other or in combination with each other:

said at least one suspension member is located at a free front end of the second segment;

said at least one suspension member is a snout which comprises:
  a connecting rod for fastening to the turbine engine, which extends in said front plane, and
  a cylindrical body which is engaged in a housing of the free end of the second segment and which is able to pivot in this housing about an axis parallel to said first axis of elongation;

the first segment carries three suspension connecting rods in said rear plane, these three connecting rods comprising:
  two lateral connecting rods extending respectively on either side of the first segment, symmetrically with respect to a vertical median plane passing through said first axis of elongation, and
  a central connecting rod located under the first segment;

the first segment has a length L1 measured along the first axis of elongation, which is less than or equal to a length L2 of the second segment measured along this axis; alternatively, L1 is greater than or equal to L2;

the second segment comprises an upper platform for fastening at least one root of a rectifier vane;

the second segment carries a root blank of a rectifier vane;

said or each rectifier vane is a stationary vane or a variable pitch vane;

the second segment carries a root blank configured to be at the root of a rectifier vane;

the rectifier vane being of variable pitch, the structure comprises a mechanism for guiding the root of the vane and/or an actuation system;

said front plane is located upstream of or perpendicular to the leading edges of the vanes, and the rear plane is located downstream of the trailing edges of the vanes.

This invention also relates to an assembly comprising an aircraft turbine engine and a linking structure as described above, the turbine engine being configured to be mounted in a cantilevered manner onto a pylon by means of this linking structure.

The assembly according to the invention may comprise one or more of the following characteristics, taken alone from each other, or in combination with each other:

said structure has a generally elongated shape, the turbine engine has a longitudinal axis and comprises a gas generator comprising, from upstream to downstream, in the direction of flow of the gases, at least one compressor, an annular combustion chamber and at least one turbine, the gas generator defining a main annular duct for the flow of a first air flow, and the gas generator being intended to be surrounded by a secondary annular duct for a second air flow, the gas generator driving a propeller located upstream of the main and secondary streams, the linking structure being fastened to the gas generator, downstream of the propeller, so that its axis of elongation is located at a radius measured with respect to the longitudinal axis, which is between the minimum radius and the maximum radius of the propeller;

said turbine engine is of the ducted or unducted type, said secondary duct is ducted or unducted;

said propeller is located upstream of the main and secondary ducts;

alternatively, the propeller is located downstream of these ducts;

the linking structure is fastened to the gas generator downstream of the propeller; alternatively, the linking structure is fastened to the gas generator upstream of the propeller;

the turbine engine comprises an annular row of rectifier vanes which is located downstream of the propeller in the secondary duct, the second segment of the structure being located between two adjacent vanes of that row of vanes or carrying one of the vanes of that row of vanes;

the rectifier vanes are either stationary vanes or variable pitch vanes;

the rectifier vanes are located downstream of the propeller in the secondary duct;

said front plane is located upstream of or perpendicular to leading edges of the vanes in the row of vanes, and/or said rear plane is located downstream of trailing edges of the vanes in the row of vanes;

the assembly further comprises a pylon having a second axis of elongation and comprising a front end for fastening to the first segment of the structure;

the assembly also comprises thrust-recovery bars, these bars comprising front ends fastened to the gas generator and rear ends connected to a rudder fastened to the pylon, behind the structure.

BRIEF DESCRIPTION OF THE FIGURES

Further characteristics and advantages of the invention will become apparent from the following detailed description, for the understanding of which reference is made to the appended drawings in which:

FIG. 1 is a very schematic view of an assembly comprising an aircraft turbine engine and its hooking pylon, according to the technique prior to the invention;

FIG. 2 is a very schematic view of an aircraft turbine engine and shows the points for fastening and suspending to a hooking pylon, according to the technique prior to the invention;

FIG. 3 is a very schematic view of another aircraft turbine engine and shows points for fastening and suspending on a hooking pylon, according to the technique prior to the invention;

FIG. 4 is a schematic perspective view of an assembly comprising an aircraft turbine engine, an hooking pylon, and a linking structure of the turbine engine to the pylon, according to a preferred embodiment of the invention;

FIG. 5 is a schematic side view of the pylon and of the linking structure of FIG. 4;

FIG. 6 is a schematic perspective view of a front suspension member of the linking structure of FIG. 4;

FIG. 7 is another schematic perspective view of the front suspension member of the linking structure of FIG. 4;

FIG. 8 is a schematic perspective view of the rear suspension connecting rods of the linking structure of FIG. 4;

FIG. 9 is a schematic front view of a portion of the turbine engine and the linking structure of FIG. 4;

FIG. 10 is a schematic top view of a portion of the turbine engine and the linking structure of FIG. 4;

FIG. 11 is a view similar to FIG. 9, representing a variant of the invention;

FIG. 12 is a view similar to FIG. 10 and shows the same variant of the invention;

FIG. 13 is a schematic side view of the linking structure of FIG. 4 during a hoisting step towards the pylon; and FIG. 14 is a schematic front perspective view of the linking structure and the pylon of FIG. 4, and illustrates the moments that apply in operation at the points for linking the structure to the turbine engine.

DETAILED DESCRIPTION OF THE INVENTION

FIG. 1 shows a turbine engine 10 for an aircraft, this turbine engine 10 being a turbofan engine with double flow and double body.

The axis A is the longitudinal axis of the turbine engine. The orthonormal reference frame XYZ is shown in some figures, including FIG. 1. The direction X is parallel to the axis X and oriented towards the upstream or the front of the turbine engine 10, the axis Y is oriented upwards, and the axis Z is oriented towards one side.

The turbine engine 10 comprises a gas generator 12 which comprises, from upstream to downstream with reference to the flowing of the gases along the axis A, a LP or low-pressure compressor 14, a HP or high-pressure compressor 16, an annular combustion chamber 18, a HP or high-pressure turbine 20 and a LP or low-pressure turbine 22.

Although not visible in FIG. 1, the rotor of the HP compressor 16 is connected to the rotor of the HP turbine 20 by a high-pressure shaft, and the rotor of the LP compressor 14 is connected to the rotor of the LP turbine 22 by a low-pressure shaft which passes through the high-pressure shaft and which drives in rotation a propulsion propeller located upstream of the gas generator 12 and which is surrounded by an annular casing referred to as the fan casing 24.

The fan casing 24 is connected to the gas generator 12 by an intermediate casing 26 which comprises a central hub 28 and a series of radial arms linking the hub 28 to the fan casing 24.

The gas generator 12 defines a main annular duct for the flow of a first air flow, referred to as the primary flow. The gas generator 12 is surrounded by a secondary annular duct for the flow of a second air flow, referred to as the secondary flow.

The air flow entering the fan is divided into one portion forming the primary flow. The air in this primary flow is compressed in the LP 14 and HP 16 compressors, then mixed with fuel and burnt in the combustion chamber 18. The combustion gases from the primary flow are then expanded in the HP 20 and LP 22 turbines and finally flow into an exhaust nozzle 30.

The other portion of the air flow entering the fan forms the secondary flow which flows around the gas generator 12 and is intended to be mixed with the primary flow downstream of the nozzle 30.

The turbine engine 10 is fastened to an element of the aircraft by means of a pylon 32 which has a generally elongated shape along the axis A and therefore comprises an axis of elongation B parallel to the axis A. The pylon 32 comprises members 34, 38 for fastening and suspending the turbine engine 10. FIGS. 1 to 3 illustrate the prior art prior to the present invention.

In the first case illustrated in FIGS. 1 and 2, there are three points or areas where the pylon 32 is fastened to the turbine engine 10. Two of the points are located in an upstream or front plane P1 perpendicular to the axis A and the last point is located in a downstream or rear plane P2 perpendicular to the axis A.

At the level of the plane P1, a first fastening member 34 ensures the connection of the pylon 32 to the fan casing 24. At the level of the plane P2, the fastening member 38 ensures the fastening of the pylon 32 to a turbine or exhaust casing 40. This fastening member 38 is also connected by thrust recovery bars 36 to the hub 28 of the intermediate casing 26. These bars 36 ensure the transmission of the thrust from the turbine engine 10 to the pylon 32 and therefore to the aircraft.

In the second case shown in FIG. 3, there are only the two fastening points in the aforementioned plane P1, so the turbine engine is mounted in a cantilevered manner to the pylon 32. In this case, at the level of the plane P1, the fastening member 34 ensures the connection of the pylon 32 to the fan casing 24 and thrust-reacting connecting rods 36 ensure the connection of the hub 28 of the intermediate casing 26 to the pylon 32, by means of a fastening member (not shown) which is fastened to the pylon without being fastened to the turbine engine.

FIG. 4 illustrates a preferred embodiment of the invention, which relates to a structure 50 for linking and fastening in a cantilevered manner an aircraft turbine engine to a pylon 32.

The turbine engine 10 is shown in part in FIG. 4 and the above description in relation to FIG. 1 can be applied to the turbine engine 10 of FIG. 4 except in relation to the fastening of the turbine engine 10 to the pylon 32. In this figure, the fan casing 24 is not shown because the invention applies to a propeller 52 which is ducted by such a casing 24 to form a fan, or which on the contrary is not ducted.

The propeller 52 comprises vanes that extend radially with respect to the axis A of the turbine engine 10. The vanes of the propeller 52 extend between a minimum radius Rmin measured at the root of the vanes from the axis A, and a maximum radius Rmax measured from the tips of the vanes from the axis A. As mentioned above, the air flow F1 which passes through the propeller 52 is divided downstream of the propeller 52 into a primary flow F2 which flows into the gas generator 12, and a secondary flow F3 which flows around the gas generator 12.

Downstream of the propeller 52, the turbine engine 10 includes fixed rectifier vanes 54, commonly known as Outer Guide Vanes (OGV). These vanes 54 extend radially with respect to the axis A from a shell of the intermediate casing 26.

The pylon 32 has its axis of elongation B parallel to the axis A and its upstream or front end is located downstream of the trailing edges 54b of the vanes 54. The pylon 32 has its front end 32a which is located at or above the intermediate casing 26.

A specificity of the mounting is the position of the pylon 32 in relation to the secondary flow F3. Unlike the prior art in FIG. 1, where the pylon 32 extends at a radial distance from the gas generator 12, the pylon 32 in FIG. 4 extends as close as possible to the gas generator 12. The axis of elongation B is therefore located at a radius from the axis A, which is between Rmin and Rmax. As mentioned above in relation to FIG. 3, the turbine engine 10, which is mounted in a cantilevered manner to the pylon 32, is connected to the latter by thrust-reacting bars 36.

The bars 36, of which there are two, are arranged symmetrically with respect to a vertical median plane passing through the axis A. They each comprise front ends 36a fastened to the gas generator 12, for example at the level of the intermediate casing 26, and rear ends 36b connected to a rudder 56 fastened to the pylon 32, at a distance from its axial end 32a. The ends 36a, 36b of the connecting rods 36 are preferably hinged by ball-and-socket joints, respectively to clevises secured to the intermediate casing 26, and clevises secured to the rudder 56.

The turbine engine 10 is fastened and suspended from the pylon 32 by means of a single linking structure 50 which defines two planes, front P1 and rear P2 respectively, for suspending the turbine engine to the pylon.

As can be seen in FIG. 4, the linking structure 50 is located at the level of the front end 32a of the pylon 32, so that the rear suspension plane of the turbine engine 10 is brought closer to the front and to the front plane P1, allowing the turbine engine 10 to be mounted in a cantilevered manner. Reference is now made to FIGS. 5 to 8, which allow a clearer view of the characteristics of the linking structure 50.

The linking structure 50 has a generally elongated shape and has an axis of elongation C parallel to the axes A, B.

The structure 50 essentially comprises two axial segments, namely:
 a first axial segment 50a for fastening to the pylon 32, which is a rear segment, and
 a second axial segment 50b intended to extend in front of the pylon 32 and which is therefore a front segment.

Although this is not limiting, FIG. 5 shows that the first segment 50a has a length L1 measured along the axis C, which is less than or equal to the length L2 of the second segment 50b measured along this axis.

The first segment 50a comprises an upper end 60 which defines a substantially horizontal plane P3 of interface with the pylon 32.

This first segment 50a also comprises a lower end carrying suspension connecting rods 62, 64 which are intended to be connected to the turbine engine 10 and which extend in the rear plane P2.

The second segment 50b comprises at least one suspension member 66 which is intended to be connected to the turbine engine 10 and which extends in the front plane, P1.

The linking structure 50 can be formed integrally or from several parts assembled together. Advantageously, it comprises a main beam 68 which forms the first segment 50a and an upper portion of the second segment 50b. The lower portion of the second segment 50b is then formed by a structural part 70 fastened and fixed under the beam 68, as shown in FIG. 7, but which can be integrated into this beam 68. The interface plane P4 between the beam 68 and the part 70 may be substantially horizontal.

The suspension member 66 is located at a free front end of the second segment 50b and is formed here by a snout which comprises:
 a flange 72 for fastening to the turbine engine 10, which extends in said front plane P1, and
 a cylindrical body 74 which engages in a housing 76 of the free end of the second segment 50b, and in particular in the part 70. The body 74 is able to pivot in this housing 76 about an axis D parallel to the axis of elongation C. It is thus understood that, in the front plane P1, the linking structure 50 is connected to the turbine engine 10 by a sliding pivot connection allowing rotational movements about the axis D.

The member 66 may be configured to allow the turbine engine 10 a degree of freedom along the axis X. In other words, the member 66 may not be configured to take up the forces of the turbine engine 10 and transmit them to the pylon 32 in the direction X. Advantageously, therefore, the member 66 is configured to take up the forces in the directions Y and Z.

In the example shown, the linking structure 50 comprises three suspension connecting rods 62, 64 in the rear plane P2, including:
 two lateral connecting rods 62 extending respectively on either side of the first segment 50a, symmetrically with respect to a vertical median plane passing through the axis C, and
 a central connecting rod 64 located under the first segment 50a.

The connecting rods 62 and 64 are hinged by ball-and-socket joints respectively to clevises 78 secured to the gas generator (in particular at the level of the intermediate casing), and to the segment 50a.

The connecting rods 62, 64 are configured to take up and transmit the forces applied to the turbine engine in the directions Y and Z and the moments in the direction X. FIG. 14 shows that the forces in the directions Y and Z are taken up by the connecting rods 62 (arrows F6), and that the connecting rod 64 takes up the moments in the direction X (arrow F7).

The thrust-recovery connecting rods (36) take up the forces following the direction X.

As can be seen in FIG. 4 in particular, the linking structure 50 extends forward in the extension of the pylon 32 and is fastened to the gas generator 12, downstream of the propeller 52, so that its axis of elongation C is located at a radius measured with respect to the axis A, which is between the radii Rmin and Rmax.

The front segment 50b of the structure 50 is located at the level of the stationary vanes 54 and two configurations are possible.

According to a first configuration illustrated in FIGS. 5, 9 and 10, the front segment 50b of the structure 50 carries one of the vanes 54.

In this case, the front segment 50b comprises an upper platform 79 configured to be connected or secured to a vane 54, in particular to the vane located at 12 o'clock. In practice, this upper platform 79 can carry a root blank 80 configured to be fastened to the root of a vane 54.

According to another configuration illustrated in FIGS. 11 and 12, the front segment 50b of the structure 50 is located between two adjacent vanes 54.

In a variant not shown, the vanes 54 are of the variable pitch type and are therefore each able to be angularly positioned around a radial axis at a precise angle. In this case, the structure 50 may comprise a mechanism for guiding the root of the vane 54, such as a bearing, and/or an actuation system comprising, for example, connecting rods, a gear, an actuator, and so on.

In yet another variant not shown, the structure 50 could support two or more vanes 54.

FIG. 5 shows that, in the example shown, the front plane P1 is located upstream of or perpendicular to the leading edges 54a of the vanes 54, and the rear plane P2 is located downstream of the trailing edges 54b of the vanes 54 and is intended to pass to the level of the intermediate casing of the turbine engine.

FIG. 13 illustrates a step and a method for hoisting a turbine engine 10 equipped with the linking structure 50 to the pylon 32.

Although the turbine engine is not shown in this drawing, it should be understood that the structure 50 is previously fastened to the turbine engine, i.e., the flange 72 of its member 66 is fastened to a complementary flange of the gas generator 12, upstream of or perpendicular to the leading edges 54a of the vanes 54, as mentioned above, and the connecting rods 62, 64 are also fastened to the gas generator. The structure 50 therefore has the advantage of being able to be fastened to the turbine engine in the assembly line of the latter. The thrust-reacting connecting rods 36 can also be fastened to the turbine engine 10.

The turbine engine can be moved on the ground by means of a carriage or suspended and moved by one or more hoists.

The turbine engine is positioned under the pylon 32 so that the axes B and C are parallel and the segment 50a of the structure 50 is located just below the pylon 32, as shown in FIG. 13. The turbine engine is then hoisted towards the pylon 32 by a single vertical translation movement from the bottom to the top (arrows F5), until the segment 50a and the pylon are supported in the interface plane P3.

The structure 50 can then be fastened to the pylon 32, for example by screw-nut type means or similar. The rudder 56 fastened to the connecting rods 36 can also be fastened to the pylon behind the structure 50, as shown in FIG. 5.

The invention claimed is:

1. A structure for linking and supporting a turbine engine to an aircraft pylon, the structure having a first axis of elongation intended to extend parallel to a second axis of elongation of the pylon, the structure comprising:
   a first axial segment for fastening to the pylon, this first segment comprising an upper end which defines a substantially horizontal plane of interface with the pylon, and a lower end carrying suspension connecting rods which are intended to be connected to the turbine engine and which extend in a first substantially vertical plane, referred to as the rear plane, and
   a second axial segment which is intended to extend in front of the pylon and comprising at least one suspension member which is intended to be connected to the turbine engine and which extends in a second substantially vertical plane, referred to as the front plane, this front plane being at an axial distance from the rear plane,
   wherein the second segment comprises an upper platform for fastening at least one root of a rectifier vane.

2. The linking structure according to claim 1, wherein said at least one suspension member is located at a free front end of the second segment.

3. The linking structure according to claim 2, wherein said at least one suspension member is a snout which comprises:
   a connecting rod for fastening to the turbine engine, which extends in said front plane, and
   a cylindrical body which is engaged in a housing of the free end of the second segment and which is able to pivot in this housing about an axis parallel to said first axis of elongation.

4. The linking structure according to claim 1, wherein the first segment carries three suspension connecting rods in said rear plane, these three connecting rods comprising:
   two lateral connecting rods extending respectively on either side of the first segment, symmetrically with respect to a vertical median plane passing through said first axis of elongation, and
   a central connecting rod located under the first segment.

5. The linking structure according to claim 1, wherein the second segment comprises an upper platform for fastening at least one root of a rectifier vane.

6. The linking structure according to claim 1, wherein, the rectifier vane being of variable pitch, the structure comprises a mechanism for guiding the root of the vane and/or an actuation system.

7. The linking structure according to claim 1, wherein said front plane is located upstream of or perpendicular to leading edges of the vanes, and the rear plane is located downstream of trailing edges of the vanes.

8. An assembly comprising an aircraft turbine engine and a linking structure according to claim 1, the turbine engine being configured to be mounted in a cantilevered manner on a pylon by means of this linking structure.

9. The assembly according to claim 8, wherein the turbine engine has a longitudinal axis and comprises a gas generator comprising, from upstream to downstream, in the direction of flow of the gases, at least one compressor, an annular combustion chamber and at least one turbine, the gas generator defining a main annular duct for the flow of a first air flow, and the gas generator being intended to be surrounded by a secondary annular duct for a second air flow, the gas generator driving a propeller and the linking structure being fastened to the gas generator so that its axis of elongation is located at a radius measured with respect to the longitudinal axis, which is between the minimum radius (Rmin) and the maximum radius (Rmax) of the propeller.

10. The assembly according to claim 8, wherein the turbine engine comprises an annular row of rectifier vanes which is located in the secondary duct, the second segment of the structure being located between two adjacent vanes of that row of vanes or carrying one of the vanes of that row of vanes.

11. The assembly according to claim 10, wherein said front plane is located upstream of or perpendicular to leading edges of the vanes of the row of vanes, and/or said rear plane is located downstream of trailing edges of the vanes of the row of vanes.

12. The assembly according to claim 8, wherein it further comprises a pylon having a second axis of elongation and comprising a front end for fastening to the first segment of the structure.

13. The assembly according to claim 1, wherein the upper platform carry a root blank configured to be fastened to the root of the rectifier vane.

* * * * *